United States Patent Office 3,413,197
Patented Nov. 26, 1968

3,413,197
CONTROLLED SENSITIVITY GALACTOSE TEST
COMPOSITION AND PROCESS
Joseph W. Fraser, Dunlap, Ind., assignor to Miles Laboratories, Inc., Elkhart, Ind., a corporation of Indiana
No Drawing. Filed June 30, 1966, Ser. No. 561,751
11 Claims. (Cl. 195—103.5)

The present invention relates to new and improved test compositions and processes and is particularly concerned with an enzymatic test system useful for the qualitative detection and quantitative determination of galactose in biological fluids, foods extracts and ingested liquids. In one of its more particular aspects it relates to a means for controlling the sensitivity of such galactose test systems. In another of its more particular aspects its relates to an improved galacatose test composition incorporated with a carrier member.

Galactose is one of the naturally occurring aldohexoses. When ingested, it is normally absorbed from the intestines and converted into glucose which is assimilated by the tissues. In certain abnormal conditions, such as hepatic insufficiency and inborn errors of metabolism, galactose is not completely converted into glucose and is disposed of by excretion in the urine.

In infants particularly, it has been found that a concentration of galactose in the urine above a predetermined minimal amount is a particularly dangerous indication and unless galactose intake is controlled the result may be mental retardation, cataract formation and hepatic damage. Thus there is a need for a quick and reliable means for detecting galactose in urine and other fluids. Moreover, in order to be useful in mass screening tests, the test means must be non-responsive to those fluids containing predetermined minimal amounts of galactose.

Clinical testing for hepatic failure and other abnormal conditions associated with an elevated galactose concentration in body fluids such as urine and blood has most often involved the use of certain complex, time consuming and often non-specific tests for the presence of galactose in such fluids.

Recently, however, it has been found that galactose may be rapidly determined by utilizing, in the presence of oxygen, a relatively specific enzyme, galatcose oxidase, to catalyze the conversion of galactose to hydrogen peroxide and, it is believed, a dialdehyde. The stoichiometric relation and subsequent estimation of the hydrogen peroxide formed in this reaction make this analytical scheme quantitative, or if desired, the hydrogen peroxide may merely be detected to effective a qualitative test for galactose. For purposes of convenience, the term "detection" as used hereinafter refers to and is defined as the quantitative estimation of galactose as well as the qualitative testing therefor.

The prior art tests for galactose generally utilize galactose oxidase, a second enzyme, peroxidase, which catalyzes the response of an oxidation-reduction indicator, such as o-tolidine to the hydrogen peroxide formed in the galactose degradation and a buffer system for maintaining the test composition in a pH range amenable to optimum reaction of the enzyme and indicator systems.

These prior art methods for the detection of galactose, however, suffer from the disadvantage, as indicated hereinabove, in that they are unable to reject positive responses to fluids containing certain predetermined galactose concentrations.

It is therefore an object of the present invention to provide an improved enzymatic test composition and process for detecting galactose in fluids which provides a means for controlling the response of the test composition and thus preventing false positive response to those fluids containing predetermined minimal concentrations of galactose.

It has now been found that these and other objects, which will become apparent from the ensuing disclosure and the appended claims, are accomplished by incorporating certain sensitivity controlling agents into the test compositions described herein.

The novel test compositions of the present invention thus comprise essentially galactose oxidase, a material having peroxidative activity, an indicator system which is responsive to a reaction product or products of the test composition and galactose and at least one sensitivity controlling agent.

Galactose oxidase is a material having the ability to catalyze the degradation of galactose and may be prepared by various fermentation methods as disclosed in the prior art. Such an enzyme is operative in the presence of oxygen to specifically catalyze the oxidation of galactose to the aforementioned reaction products, hydrogen peroxide and a dialdehyde. The value of such a material resides in its specificity for galactose and thus enables the detection of galactose in the presence of other sugars such as glucose.

The material having peroxidative activity, is and as used herein is defined as, any material which catalyzes the response of an oxidation-reduction indicator to the hydrogen peroxide formed in the catalytic oxidation of the galactose. Generally this material comprises peroxidase which may be derived from several natural sources, such as horseradishes, potatoes, fig tree sap, turnips and white blood corpuscles. In addition to peroxidase, various other substances show peroxidase-like activity. Such substances include hemin, methemoglobin, oxyhemoglobin, hemoglobin, hemochromogen, alkaline hematin, urohemin, and certain molybdate-iodide complexes.

For purposes of convenience, the peroxidases, and other such substances having the above described activity will hereinafter be referred to as materials having peroxidative activity, although it is understood that these materials may not all function in the same manner. Such materials having peroxidative activity, therefore, by definition, include any substance which catalyzes or enhances the response of an indicator to hydrogen peroxide although in the practice of the present invention the material having peroxidative activity may contribute to the system in other ways.

Those substances which are responsive to the presence of hydrogen peroxide in the presence of the material having peroxidative activity are the indicator materials within the contemplation of the present invention. A single indicator may be utilized, but if a response is desired which changes from one color to another upon a change in concentration of galactose in the fluid being tested, a plurality of indicators is called for. Such indicators which may be utilized include, for example, benzidine, various benzidine derivatives such as o-tolidine and o-dianisidine, and other materials such as gum guaiac, 2,7-diaminofluorene, and the like.

In order to produce a test having the desired stability, reactivity and sensitivity it is important that the aforementioned ingredients when contacted with the fluid being tested be buffered at a hydrogen ion concentration of about from pH 5.5 to pH 8.0. Preferably an approximately neutral pH should be utilized, for example, one in the range of about from pH 6.8 to pH 7.2. Of the numerous buffers which may be utilized to maintain the pH of the ingredients within the desired range, it has been found that phosphate buffers and those buffers which consist of a weak inorganic acid such as boric acid or an organic polycarboxylic acid such as glutamic acid in combination with tris (hydroxymethyl) aminomethane to form the corresponding tris (hydroxymethyl) methyl ammonium salt produce results which, both with respect to stability and sensitivity, are quite acceptable. In addition to glutamic acid, other polycarboxylic acid salts of tris (hydroxymethyl) aminomethane which may be used include tris (hydroxymethyl) methyl ammonium phthalate, tris (hydroxymethyl) methyl ammonium malonate and tris (hydroxymethyl) methyl ammonium citrate.

Wettings agents or surface active agents may be used in the compositions of this invention to assure an even distribution of the ingredients when these compositions are used to impregnate bibulous carriers, such as filter paper, to produce the so-called "dip-and-read" test strips or sticks. Various types of wetting agents may be used for this purpose including cationic, anionic and non-ionic varieties. Exemplary of the wetting agents which may be used are bis (2-ethylhexyl) sodium sulfosuccinate and polyoxyethylene sorbitan monooleate. Wetting agents are not essential, but their use contributes desired elegance to test strips made from the compositions of this invention.

In preparing the compositions of the present invention it has been found that the various constituents may be varied over a relatively wide range of concentrations. Generally, however, the following ranges of ingredient proportions in 100 ml. of solution may be considered preferable:

| | | |
|---|---|---|
| Galactose oxidase | units[1] | 10,000–30,000 |
| Peroxidase | mg | 1–20 |
| Indicator material | mg | 10–100 |

As indicated hereinabove, when testing fluids for the presence and amount of galactose, the assay should be non-responsive to certain minimal amounts of galactose. In this regard, it has been found that by incorporating certain sensitivity controlling agents into the enzymatic test composition herein described, a system is achieved which allows the facile screening of fluids for galactose and yet is not responsive to a preselected minimal amount of galactose. Such materials as propyl gallate and ascorbic acid and mixtures thereof have been found to be particularly advantageous in this use.

It should be noted that in utilizing enzymatic test compostions such as disclosed in the present invention, the chromogenic response of the indicator material is usually read at a fixed time interval starting from the initial contact with the solution being tested. For example, it is customary to read the response developed in the glactose determination 60 seconds after contacting the fluid being tested. If the response is not read at that time, erroneous results may be obtained. In utilizing the sensitivity controlling agents of the present invention, it should thus be kept in mind that their effect is to retard the time of response and that failure to observe the time requirement may result in a false positive response even though the sensitivity controlling agent is present in the test composition.

In utilizing propyl gallate individually as a sensitivity controlling agent, it has been found that up to about 0.11% by weight propyl gallate may be included in the test compositions described herein. Preferably about 0.08% propyl gallate is added to the test composition since it has been found that this amount allows the rejection of a positive response to up to about 100 mg. percent of galactose in urine having a specific gravity of 1.01 or less when the response is read in one (1) minute. Lower concentrations of propyl gallate, of course, allow a positive response to lower concentrations of galactose in the test fluid.

Ascorbic acid likewise may be used individually and it has been found that this sensitivity controlling agent may be used in a concentration of from about 0.06% by weight to about 0.15% by weight. If more sensitivity control is desired, an amount of propyl gallate may be added with the ascorbic acid. In this regard, it has been found that after the maximum amount of ascorbic acid is utilized, up to about 0.05% propyl gallate may be added to the test composition. As used hereinabove, percent by weight is defined as the percent, on a weight basis, of the constituent when compared to the total dry weight of the test composition.

It is preferable in the present invention to incorporate the test composition with a carrier and utilize this combination as a dip-and-read test device. This is not, however, to be construed as placing any limitation on the physical makeup of the present novel test composition. It will be appreciated that such compositions may be utilized in the form of tablets, powders and solutions, to mention only a few of the various forms thereof. However, in the preferable embodiment of the present invention the test composition is incorporated into and/or upon a bibulous carrier. This may be achieved by various methods which include impregnating a bibulous material with a solution of the test composition and thereafter drying the impregnated test device, adhesively fixing to the surface of the carrier a finely divided, dry, intimate mixture of the ingredients, and the like. The preferable mode of preparation is the impregnation of the bibulous carrier with a solution or solutions of the test composition, followed by drying.

When ascorbic acid is utilized as a sensitivity controlling agent in the compositions of the present invention and such compositions are incorporated with a bibulous carrier by means of an aqueous solution impregnation technique, it will be appreciated that a certain risk is involved since ascorbic acid is relatively unstable in aqueous solution. It has therefore been found that a two solution impregnation technique is a preferable mode of preparing such dip-and-read devices. In this two solution impregnation technique, the bibulous carrier is first impregnated with a solution of ascorbic acid in a non-aqueous solvent and the solvent removed therefrom. The ascorbic acid containing carrier is then impregnated with a solution of the remaining constituents including the proply gallate, if desired, and the thus impregnated carrier again dried. The non-aqueous solvents useful in the first impregnation are those in which ascorbic acid is soluble and stable. Such solvents include ethyl alcohol, methyl alcohol and the like. The preferable solvent has been found to be ethyl alcohol.

When a two solution impregnation technique is employed in conjunction with a bibulous carrier it has been found that a non-aqueous solution of from about 0.003% (weight/volume) to about 0.01% (weight/volume) of ascorbic acid may be utilized.

When a bibulous carrier is employed the carrier material may be any of a variety of substances. For example, filter paper, wood strips, synthetic plastic fibrous materials, non-woven or woven fabrics and so on, may be utilized in this embodiment. The preferable bibulous material is filter paper having a thickness of about 0.01 inch to about 0.02 inch. Moreover, the bibulous material may be used in conjunction with semi-rigid plastic backing material.

The mode of use of the test device, using the impregnated bibulous carrier will now be described. In conducting the test for glactose, the device is immersed in the fluid being tested and immediately withdrawn. This is done since the pH of the moistened device must be dominated by the buffer in the test composition. If the test device were allowed to remain in the fluid for any length of time, there would be a danger that the test composition ingredients would be leached from the carrier into the fluid. The color developed due to the presence of galactose is then read by its visual appearance or by comparison with a color chart. Various instrumental methods may also be employed to determine the quality of the color developed, thus increasing the accuracy of the test by removing the subjective determination of color by the human eye.

---

[1] Since the activity of galactose oxidase varies, it is customary to express the amount used on the basis of units rather than weight. As used herein, a unit of galactose oxidase may be defined as that quantity of galactose oxidase that will give the activity equivalent to one unit of glucose oxidase as defined by D. Scott in Journal of Agriculture and Food Chemistry, 1, 727 (1953).

The actual compounding of the test composition will be illustrated by the following examples which are included for illustrative purposes only and are not to be construed as placing any limitation upon the inventive concept as disclosed herein.

EXAMPLE 1

A test composition solution was prepared by mixing the following constituents in the order presented:

| | |
|---|---|
| Phosphate buffer, 0.3 M (prepared by dissolving 5.0 g. of $Na_3PO_4 \cdot 12H_2O$ and 2.4 g. of $NaH_2PO_4 \cdot H_2O$ in distilled water and bringing the total volume to 100 ml. with distilled water) _____ml__ | 5.0 |
| Distilled water _____ml__ | 5.0 |
| Peroxidase (1 mg./ml. aqueous solution) ___ml__ | 5.0 |
| Bis (2-ethylhexyl) sodium sulfosuccinate (21% ethyl alcohol solution) _____ml__ | 0.05 |
| Ethyl alcohol (95%) _____ml__ | 5.0 |
| Galactose oxidase _____units__ | 4200 |
| Polyvinyl alcohol—thickening agent (10% aqueous solution) _____ml__ | 25.0 |
| o-Tolidine dihydrochloride (1% aqueous solution) _____ml__ | 5.0 |

The resultant solution had a pH of 7.0.

The lower portions of bibulous filter paper strips were then dipped into this solution and dried in a stream of air at about 60° C.

The color developed (blue) by these strips upon contacting a 0.2% galactose containing urine in one minute was then compared to strips dipped into urine containing no galactose. This color comparison was effected by using a Gardner Color Difference meter which allows the obtention of an objective numerical value for the amount of color present. See ASTM (American Society for Testing Materials) Test Method D1365–60T.

The strips showed a color value of 37.9.

EXAMPLE 2

Test strips were prepared as in Example 1 except that 1.0 ml. of a 1.6 mg./ml. aqueous solution of propyl gallate was substituted for 2.0 of the ethyl alcohol in the test solution composition. Test strips were prepared as in Example 1.

When tested on the Gardner Color Difference meter, as in Example 1, the strips showed a color value of 22.7 indicating that the strips were desensitized, and would require more galactose in the solution being tested to show equivalent to that in Example 1.

EXAMPLE 3

A solution containing 6 mg. of ascorbic acid in 100 ml. ethyl alcohol was prepared and bibulous paper strips dipped therein as in Examples 1 and 2. The strips were dried and the same area again dipped in a second solution prepared as in Example 1 and having the following composition:

| | |
|---|---|
| Galactose oxidase _____units__ | 3000 |
| Phosphate buffer, 0.3 M _____ml__ | 2.5 |
| Water, distilled _____ml__ | 9.5 |
| Peroxidase, 1 mg./ml. aqueous solution ____ml__ | 2.5 |
| Bis (2-ethylhexyl) sodium sulfosuccinate, 1% aqueous solution _____ml__ | 2.0 |
| o-Tolidine dihydrochloride, 1% aqueous solution _____ml__ | 2.5 |
| Polyvinyl alcohol, 10% aqueous solution ____ml__ | 5.0 |
| Potassium iodide _____mg__ | 200 |
| Sodium molybdate _____mg__ | 125 |

The strips were dried in a stream of air at about 60° C.

When the impregnated area of the strips was contacted with a 0.2% by weight galactose containing urine having a specific gravity of about 1.007, the color of the strip started changing from a buff to blue in about 10 seconds.

EXAMPLE 4

Test strips were prepared as in Example 3, except that a 10 mg./100 ml. ethyl alcohol solution of ascorbic acid was used as a first impregnating solution. When contacted with the same galactose containing urine (0.2% galactose—specific gravity of 1.007) as in Example 3, the strip did not respond with a change in color to blue until about 60 seconds after the contact.

EXAMPLE 5

Test strips were prepared as in Example 3, except that 1 ml. of a 0.1% aqueous propyl gallate solution was added to the second impregnating solution. When contacted with the 0.2% galactose containing urine as in Example 3, the strip did not start changing to a blue color until about 25 seconds after the contact.

In summary, the present invention provides a means for controlling the sensitivity of enzymatic galactose test compositions so that the test system is non-responsive to certain preselected minimal amounts of galactose in the fluid being tested. The test composition comprises galactose oxidase, a material having peroxidative activity, an indicator material responsive to the presence of hydrogen peroxide in the presence of the material having peroxidative activity, a buffer for effecting and maintaining an optimum environmental pH and as a sensitivity controlling agent, propyl gallate or ascorbic acid or a combination thereof.

What is claimed is:

1. A test composition for the detection of galactose in fluids comprising:
    (A) glactose oxidase;
    (B) a material having peroxidative activity;
    (C) an indicator material which is responsive to the presence of hydrogen peroxide in the presence of the material having peroxidative activity;
    (D) a buffer effective to maintain the above ingredients at a pH range of from about pH 5.5 to pH 8.0 when contacted with the fluid being tested; and
    (E) as a sensitivity controlling agent, a member selected from the group consisting of propyl gallate and a mixture of up to about 0.05% by weight propyl gallate with about 0.06% to about 0.15% by weight ascorbic acid.

2. A test composition as in claim 1 wherein the sensitivity controlling agent is propyl gallate.

3. A test composition as in claim 1 wherein the sensitivity controlling agent is the mixture of ascorbic acid and propyl gallate.

4. A test composition as in claim 1 wherein the test composition is incorporated with a bibulous carrier.

5. A process for controlling the sensitivity of a galactose test composition for the detection of galactose in fluids which comprises adding a sensitivity controlling amount of an agent selected from the group consisting of propyl gallate and a mixture of up to about 0.05% by weight propyl gallate with about 0.06% to about 0.15% by weight ascorbic acid to a composition comprising:
    (A) galactose oxidase;
    (B) a material having peroxidative activity;
    (C) an indicator material which is responsive to the presence of hydrogen peroxide in the presence of the material having peroxidative activity; and
    (D) a buffer effective to maintain the above ingredients at a pH range of from about pH 5.5 to pH 8.0 when contacted with the fluid being tested.

6. A process as in claim 5 wherein propyl gallate is the agent.

7. A process as in claim 5 wherein the mixture of propyl galalte and ascorbic acid is the agent.

8. A process as in claim 5 wherein the test composition is incorporated with a bibulous carrier.

9. A process for preparing a galactose test device having a controllable sensitivity which comprises impregnating a bibulous carrier with a first solution of a sensitivity controlling quantity of propyl gallate in a non-aqueous solvent, removing the solvent therefrom and thereafter impregnating the carrier with a second aqueous solution comprising:
 (A) galactose oxidase;
 (B) a material having peroxidative activity;
 (C) an indicator material which is responsive to the presence of hydrogen peroxide in the presence of the material having peroxidative activity; and
 (D) a buffer effective to maintain the above ingredients at a pH range of from about pH 5.5 to pH 8.0 when contacted with the fluid being tested;

and thereafter removing the aqueous portion thereof.

10. A process as in claim 9 wherein the non-aqueous solvent is an alcohol.

11. A process as in claim 10 wherein the alcohol is ethyl alcohol.

References Cited
UNITED STATES PATENTS 3,367,842   2/1968   Rupe et al. _____ 195—103.5

ALVIN E. TANENHOLTZ, *Primary Examiner.*